US010656629B2

(12) United States Patent
Sadri et al.

(10) Patent No.: US 10,656,629 B2
(45) Date of Patent: May 19, 2020

(54) METHOD AND SYSTEM FOR LINKING FIXTURE ALIGNMENT MODIFICATIONS WITH A WORKPIECE

(71) Applicant: Ford Motor Company, Dearborn, MI (US)

(72) Inventors: Hossein Jacob Sadri, Novi, MI (US); Stephen Juszczyk, Walled Lake, MI (US); Jerry Galinis, Deerfield, MI (US)

(73) Assignee: Ford Motor Company, Dearborn, MI (US)

( * ) Notice: Subject to any disclaimer, the term of this patent is extended or adjusted under 35 U.S.C. 154(b) by 117 days.

(21) Appl. No.: 15/894,985

(22) Filed: Feb. 13, 2018

(65) Prior Publication Data

US 2019/0250592 A1    Aug. 15, 2019

(51) Int. Cl.
*G05B 19/418* (2006.01)
*B21C 51/00* (2006.01)

(52) U.S. Cl.
CPC .......... *G05B 19/4183* (2013.01); *B21C 51/00* (2013.01); *G05B 2219/36089* (2013.01); *G05B 2219/37137* (2013.01)

(58) Field of Classification Search
None
See application file for complete search history.

(56) References Cited

U.S. PATENT DOCUMENTS 5,386,621 A  2/1995 Fluegge et al.
6,991,693 B2  1/2006 Wylie et al.
8,020,418 B2*  9/2011 Suzuki .................. B21D 22/20
                                            72/16.1
9,638,507 B2  5/2017 Grau et al.
10,245,630 B2*  4/2019 Fischer .................... B21D 3/10
(Continued)

FOREIGN PATENT DOCUMENTS

CN          201134030         10/2008

OTHER PUBLICATIONS

Sriram, T. et al., Applications of Barcode Technology in Automated Storage and Retrieval Systems, Aug. 1996, available at URL http://ieeexplore.ieee.org/document/571035.

*Primary Examiner* — Christie I Marshall
(74) *Attorney, Agent, or Firm* — Burris Law, PLLC

(57) ABSTRACT

The present disclosure is directed toward a dimensional automated linkage system for correlating a fixture with a workpiece. The system includes a fixture module repository, a barcode stamp, and a fixture-workpiece data controller. The fixture module repository stores a fixture record for a registered fixture module, where the fixture record includes a workpiece entry portion to link a fixture of the registered fixture module with a subject workpiece. The workpiece entry portion includes a fixture modification field to identify modifications made to the fixture for mounting the subject workpiece on the fixture. The barcode stamp is configured to include data to identify the fixture record for the registered fixture module. The fixture-workpiece data controller is communicably coupled to an external computing device and operable to populate the workpiece entry portion of the fixture record based on information acquired from the external computing device.

20 Claims, 12 Drawing Sheets

(56) References Cited

U.S. PATENT DOCUMENTS

| | | | |
|---|---|---|---|
| 2010/0067998 A1* | 3/2010 | Miyamoto | B23Q 11/0046 409/190 |
| 2011/0094279 A1* | 4/2011 | Suzuki | B21D 24/10 72/17.3 |
| 2016/0299500 A1 | 10/2016 | Drasovean | |
| 2017/0066024 A1* | 3/2017 | Fischer | B21D 3/10 |

* cited by examiner

FIXTURE RECORD

Fixture Module Information:

Barcode Info.: 1245A52

Processing Cell: Panel Assembly II

Location: Detroit Door Assembly Plant

Fixture Identifier: 451

Workpiece Linkage:

| Date &Time | Part/Job No. | Shift | Engineer | Modification To Fixture ||
| --- | --- | --- | --- | --- | --- |
| | | | | Face | Locator |
| 24Jan2017 4:15:30PM | 1245 | 3 | John Smith | B | 2-way |
| 24Jan2017 4:15:30AM | 5412 | 2 | Kelly Markus | A | 1-way |
| | | | | | |
| | | | | | |
| | | | | | |
| | | | | | |

FIG. 6B

FIXTURE-WORKPIECE REPORT

Date and Time: January 2, 2018 4:30:00 PM    Location: Detroit Assembly Plant

Part/Job Number: _____    Shift: _____

Processing Cell: Panel Assembly II    Engineer: _____

Fixture Identifier: 12345

Fixture Locator Modified: ☐ Y ☐ N

If fixture locator modified:

Identify Locator/Face Modified: _____

Direction Locator Modified: _____

[Submit]    [Cancel]

FIG. 8

METHOD AND SYSTEM FOR LINKING FIXTURE ALIGNMENT MODIFICATIONS WITH A WORKPIECE

FIELD

The present disclosure relates to a system and/or method to control modifications of a fixture during manufacturing of a component.

BACKGROUND

The statements in this section merely provide background information related to the present disclosure and may not constitute prior art.

During the manufacturing process of an article (e.g., vehicle, furniture, electronic devices, etc), fixtures are used to accurately align a component (i.e., a workpiece) at a desired coordinate or position, and to restrict the movement of the component. At times, two components formed using the same specification may be different from one another due to manufacturing variations, but still within set tolerance. Accordingly, fixtures are generally configured to accommodate such variations by having adjustable locators that are configured to receive the component at specific locations along the component.

Dimensional variations between components can be used to, for example, identifying improvements to the component design, analyzing quality of components/parts from a supplier, and/or other product development analysis. However, tracking dimensional variations can be difficult during the manufacturing process due to complexity of the manufacturing process. These and other issues are addressed by the present disclosure.

SUMMARY

This section provides a general summary of the disclosure, and is not a comprehensive disclosure of its full scope or all of its features.

In one form, the present disclosure is directed toward a dimensional automated linkage system for correlating a fixture with a workpiece. The system includes a fixture module repository, a barcode stamp, and a fixture-workpiece data controller. The fixture module repository is configured to store a fixture record for a registered fixture module, where the fixture record includes a fixture portion to identify a fixture of the fixture module and a workpiece entry portion to link the registered fixture module with a subject workpiece. The workpiece entry portion includes a fixture modification field to identify modifications made to the fixture for mounting the subject workpiece on the fixture. The barcode stamp is located at the registered fixture module, is scanable by a device, and is configured to include data to identify the fixture record for the registered fixture module. The fixture-workpiece data controller is communicably coupled to an external computing device and operable to populate the workpiece entry portion of the fixture record based on information acquired from the external computing device.

In another form, the dimensional automated linkage system further includes a plurality of barcode stamps located at a plurality of registered fixture modules. The fixture module repository stores a plurality of fixture records for the plurality of registered fixture modules, where one barcode stamp is associated with one fixture record.

In yet another form, the fixture-workpiece data controller is configured to retrieve a selected fixture record from among the plurality of fixture records in response to the barcode stamp associated with selected fixture record being scanned by the device.

In one form, the data of the barcode stamp is indicative of a file path of the fixture record within the fixture module repository.

In another form, the dimensional automated linkage system further includes a data search controller communicably coupled to the external controller and operable to search the fixture module repository based on one or more queries received from the external controller.

In yet another form, the barcode stamp is positioned on the fixture of the fixture module.

In one form, the barcode stamp is positioned on a cell frame housing the fixture.

In another form, the information from the external computing device includes workpiece identification information to identify the workpiece and fixture modification information that identifies a modification to one or more locators of the fixture. The fixture-workpiece data controller stores the workpiece identification information and the fixture modification information in the fixture record.

In yet another form, the present disclosure is directed toward a vehicle assembly data management system in communication with one or more external computing devices, and including the fixture-workplace linkage system. The vehicle assembly data management system further includes a part tracking system and a product development tool. The part tracking system is configured to store manufacturing information related to a plurality of workpieces, where the manufacturing information includes at least one of identification information for a workpiece, one or more manufacturing facilities associated with the workpiece, and performance test data of the part formed from the workpiece. The product development tool is operable to analyze data provided in the fixture-workplace linkage system and the part tracking system based on a command from an external computing device.

In one form, the present disclosure is directed toward a method for linking dimensional features of a fixture with a workpiece. The method includes storing, by a repository, a plurality of fixture records for a plurality of registered fixture modules, where each fixture record includes a fixture portion to identify a fixture associated with the registered fixture module and a workpiece entry portion to link the registered fixture module with a subject workpiece. The workpiece entry portion includes a fixture modification field to identify modifications made to the fixture for mounting the subject workpiece on the fixture. The method further includes associating a plurality of barcode stamps with the plurality of fixture records, where each barcode stamp is configured to include data to identify a fixture record from among the plurality of fixture records; displaying, by a controller, a linkage interface in response to a barcode stamp among the plurality of barcode stamps being scanned; extracting, by the controller, data from one or more of the populated query fields from among the multiple query fields of the interface; and storing, by the controller, the extracted data in the workpiece entry portion of the fixture record associated with the scanned barcode stamp. The linkage interface has multiple query fields to be populated by a user via an external computing device, and the multiple query fields includes a workpiece identification field to obtain information regarding the workpiece and a fixture modification field to obtain information regarding a modification to the fixture due to the workpiece.

In another form, the method further includes registering a fixture module with the fixture module repository as one of the plurality of registered fixture modules.

In yet another form, the registering the fixture module further includes: generating, by the fixture-workpiece data, a fixture record for the fixture module, and storing the fixture record in the fixture module repository as one of the plurality of fixture records; associating a barcode stamp with the fixture record for the fixture module; and attaching the barcode stamp to at least one of the fixture of the fixture module or an object associated with the fixture module.

In one form, the data of the barcode stamp is indicative of a unique identifier to identify the fixture record within the fixture module repository.

In another form, the method further includes: displaying, by a data search controller, a search interface having one or more search query fields to be populated; searching, by the data search controller, the fixture module repository based on one or more populated search queries received the external controller; and outputting the results of the search to the external computing device. The one or more search queries is associated with data for at least one of identifying a fixture record among the plurality of fixture records or identifying a workpiece linked to one or more of the registered fixture modules by way of the fixture record.

In one form, the present disclosure is directed toward a vehicular dimensional automated linkage system that includes a repository, a barcode, and a data controller. The repository stores a fixture record for a fixture module, and the fixture record has a workpiece entry portion to track modifications to a fixture of the fixture module due to the workpiece mounted thereon. The barcode is scanable by a device to retrieve the fixture record of the fixture module. The data controller is operable to populate the workpiece entry portion of the fixture record based on workpiece information acquired from an external computing device.

In another form, the barcode is positioned on the fixture. In yet another form, the barcode is positioned at a cell frame of the fixture module housing the fixture.

In one form, the dimensional automated linkage system further includes a plurality of the barcodes for a plurality of fixture modules. The repository stores a plurality of fixture records for the plurality of fixture modules, where one barcode is associated with one fixture record.

In another form, the data controller is configured to retrieve a selected fixture record from among the plurality of fixture records in response to the barcode associated with selected fixture record being scanned.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6B illustrates a fixture record displayed by the dimensional automated linkage system in accordance with the teachings of the present disclosure;

FIG. 8 illustrates a fixture-workpiece interface displayed by the dimensional automated linkage system in accordance with the teachings of the present disclosure;

Figure 1:
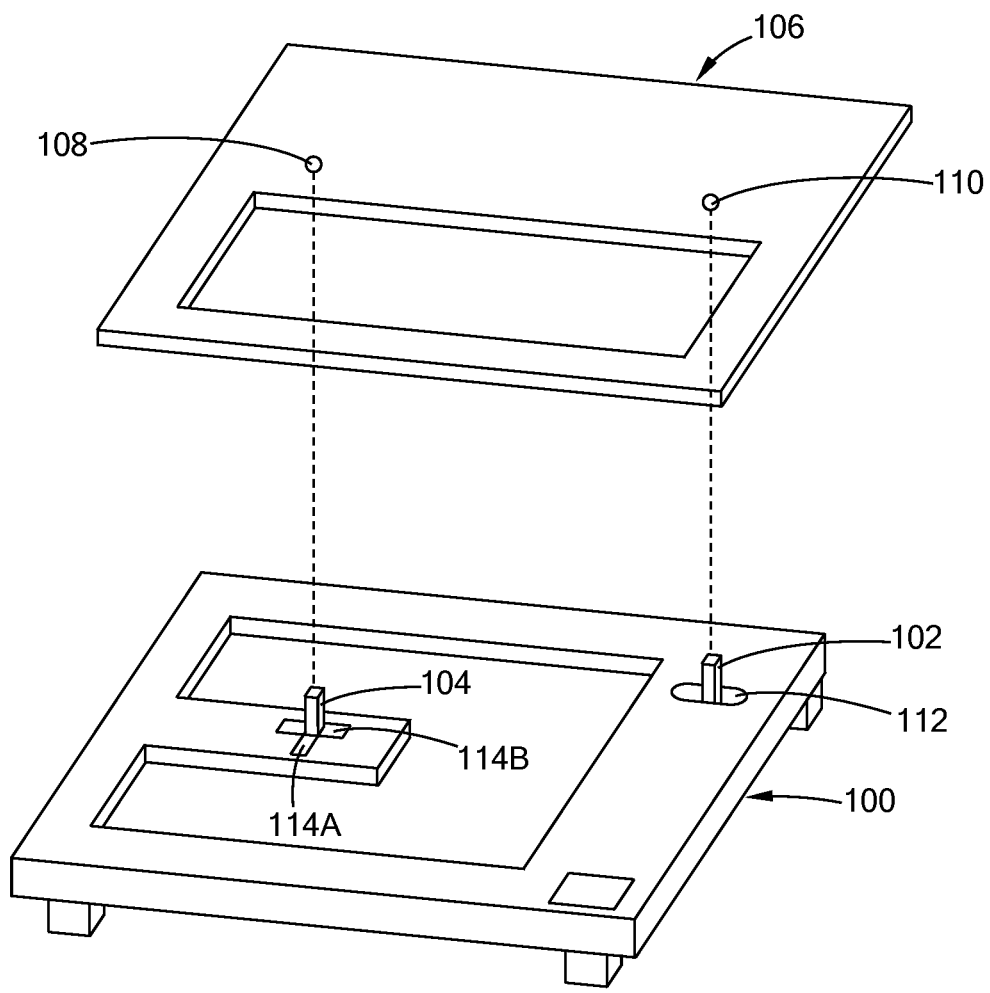
FIG. 1 illustrates a fixture having multiple locators in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A fixture is configured to control the position of a workpiece that is mounted on the fixture. In one form, the fixture is configured to have one or more locators to control the position of the workpiece at a single point (i.e., a uniaxial control), at 2-points (i.e., biaxial control), and at 3-points (i.e., planar control). For example, referring to FIG. 1, a fixture 100 includes a uniaxial locator 102 (i.e., a two-way locator) and a biaxial locator 104 (i.e., a four-way locator), which may be referred to as locators 102 and 104. The fixture 100 is configured to receive a workpiece 106 that includes a first alignment element 108 and a second alignment element 110 for engaging with the uniaxial locator 102 and the biaxial locator 104, respectively. In one form, the uniaxial locator 102 and the biaxial locator are provided as posts/pins and the first alignment element 108 and the second alignment element 110 of the workpiece 106 are holes that are received by their respective locator. While not illustrated, the fixture 100 may include a planar locator for aligning the workpiece 106 along three points.

To compensate for dimensional variations between workpieces, the locators 102 and 104 of the fixture 100 may be adjustable. That is, the alignment elements on a first workpiece may be slightly offset from that of a second workpiece. Accordingly, the locators of a fixture may be adjustable to compensate for such variation. For example, the uniaxial locator 102 may be moveable along a uniaxial path 112 and the biaxial locator 104 may move along axial paths 114A and 114B which are orthogonal to each other.

While the fixture 100 is presented as a standalone component for receiving different workpieces, a fixture can also be a part (e.g., a sub-assembly) that includes locator elements for receiving another part/workpiece. For example, a front bumper assembly of a vehicle that receives a headlamp module (e.g., a workpiece) is also a type of fixture. Specifically, the front bumper assembly includes locators, such as a uniaxial locator, to align and control the movement of the headlamp assembly. Shims can be added or removed to the uniaxial locator to compensate for any dimensional variations with the headlamp assembly.

Dimensional variations of a given workpiece can affect the characteristics of the final component (i.e., article) formed from the workpiece and possible downstream processing of the component. The present disclosure is directed towards a dimensional automated linkage system for linking or, in other words, tracking dimensional adjustments to a fixture due to a workpiece mounted thereon using an automated system. The dimensional automated linkage system manages a database of registered fixture modules, stores data related to the workpieces mounted on the fixture, and documents modifications made to the fixture module. The data stored is searchable and can be used as part of a closed-loop product development tool to, for example, determine the number of occurrences in which the fixture is modified, identify the workpieces associated with the modifications, and/or output the data to another system for correlating the modification made to the fixture with data related to the final component formed from the workpiece once mounted on the fixture. In addition, in one form, the dimensional automated linkage system is accessible by multiple computing device via a network allowing product development teams to monitor changes in the manufacturing process of a component due to dimensional variations.

Figure 2:
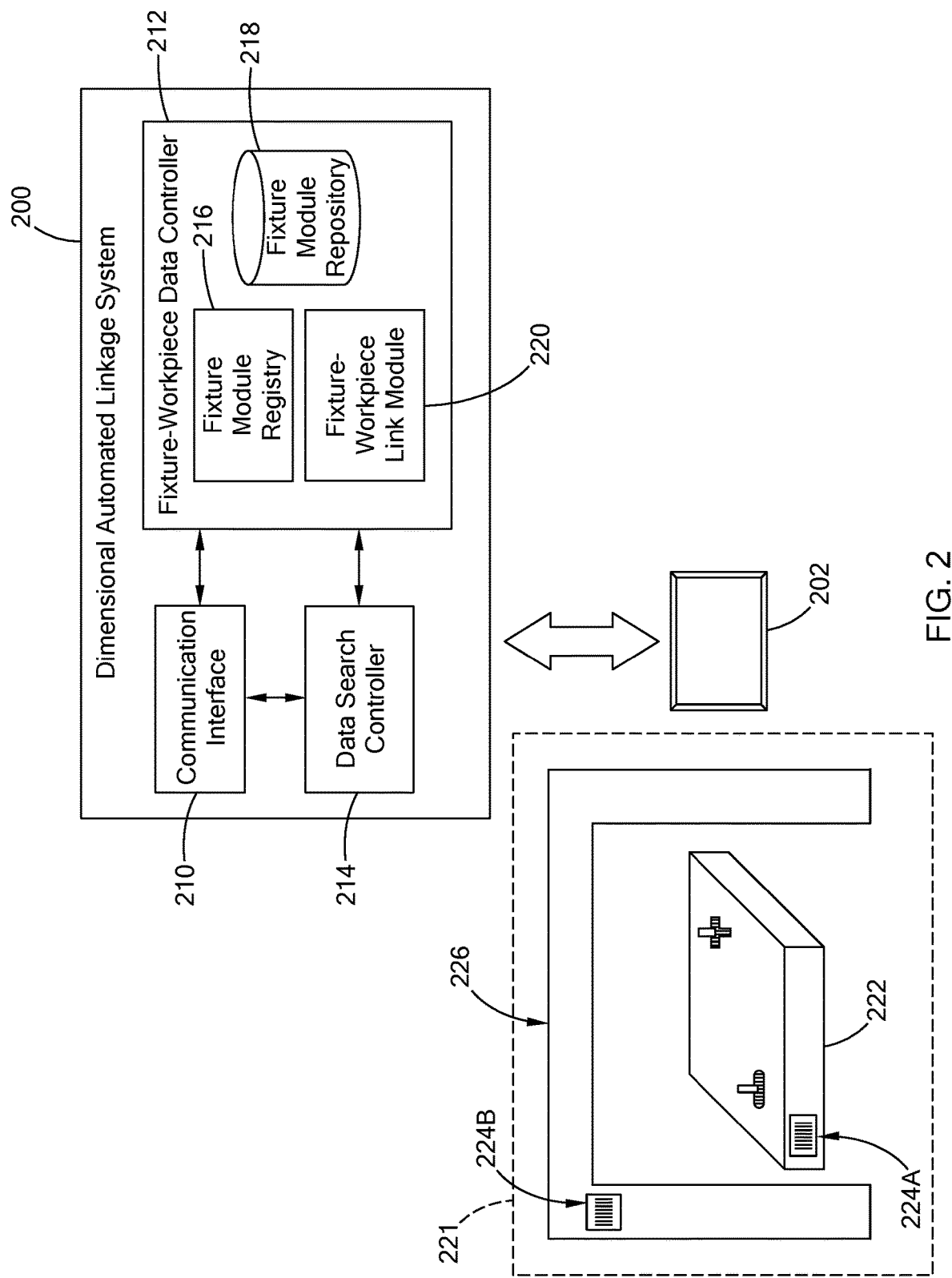
FIG. 2 illustrates a dimensional automated linkage system in accordance with the teachings of the present disclosure.

Referring to FIG. 2, a dimensional automated linkage system 200 is configured to communicate with an external computing device 202, such as a tablet computer (as illustrated), a laptop computer, a smart phone, or other suitable computing device. The system 200 and the computing device 202 are communicably coupled via a network (not shown) that is accessible via a wired or wireless communication link. While the system 200 is illustrated as being in communication with one computing device 202, the system 200 may be in communication with multiple computing devices located at the same and/or other locations.

In one form, the dimensional automated linkage system 200 is a computer or a server configured to store data and computer readable instructions in a memory (e.g., ROM/RAM) and execute the instructions via one or more processors. The system 200 is configured to include a communication interface 210, a fixture-workpiece data controller 212, and a data search controller 214. The communication interface 210 is configured to communicate with the computing device 202 via the network to permit a user to access the dimensional automated linkage system 200. Using one or more graphical user interfaces, the communication interface 210 relates information to and receives data from the computing device 202. The communication interface 210 relays the data received to the fixture-workpiece data controller 212 or the data search controller 214 for further processing.

The fixture-workpiece data controller 212 is configured to register a fixture module and store data related to the registered fixture module and the workpiece mounted on the fixture. In one form, the fixture-workpiece data controller 212 includes a fixture module registry 216, a fixture module repository 218, and a fixture-workpiece link module 220. The fixture module repository 218 may be a datastore or other suitable memory structure.

The fixture module registry 216 is configured to register a fixture module with the system 200 by creating a fixture record that is then stored in the fixture module repository 218. More particularly, in one form, a fixture module 221 to be registered with the dimensional automated linkage system 200 is assigned a barcode stamp 224 (224A and 224B in figure) that is positioned at the fixture module 222. For example, in FIG. 2, the fixture module 221 includes a standalone fixture 222 that receives workpieces and a cell frame that defines a work area having the fixture 222. Here, a barcode stamp 224A is provided at a fixture 222 and a barcode stamp 224B is provided along the cell frame 226 (e.g., an object associated with the fixture). While both locations are provided with the barcode stamp 224, one barcode stamp is sufficient. If the fixture is provided as a sub-assembly that has locators for receiving a component, the barcode stamp is positioned at the cell frame of the fixture module 221 at which the two components are assembled.

The barcode stamp 224 is a machine-readable symbol that is scanable by a device, such as a barcode scanner or the computing device 202, and may be a linear, a matrix style barcode (e.g, QR CODE), or other suitable barcode. The barcode stamp 222 includes data that correlates the fixture module 221 with its fixture record. For example, the data may include a unique character string assigned to the fixture module 221 and stored in the fixture record, a file path for retrieving the fixture record from the fixture module repository, and/or other suitable information.

The fixture module registry 216 stores a fixture record for each registered fixture module, and each fixture record provides information regarding the fixture(s) of the fixture module. For example, in one form, the fixture module registry 216 has the communication interface 210 display a registration interface that includes one or more query fields regarding the fixture module to be registered. The query fields may request information indicative of the location of the fixture module (e.g., manufacturing facility having the fixture); a processing cell; the unique character string assigned to the fixture of the fixture module (i.e., fixture identifier); and/or other suitable information. The fixture module registry 216 extracts the data from the query field and stores the data as part of the fixture record stored in the fixture module repository 218.

The fixture-workpiece link module 220 is configured to link a registered fixture module with workpieces mounted on the fixture module by storing data that identifies the workpiece being mounted on the registered fixture in the fixture record for the registered fixture. In one form, a fixture-workpiece interface is displayed to the user via the computing device 202 and the communication interface 210. The interface includes one or more query fields that can be populated by the user and one or more set fields that are automatically populated by the fixture-workpiece link module 220. For example, the query fields may include information pertaining to: the part/job number associated with the workpiece; information related when the workpiece was mounted, such as the shift and/or the engineer that positioned the workpiece; and/or possible modifications to the fixture. The set field may include a date and time stamp, and/or information extracted from the fixture record of the subject fixture, such as location, processing cell, and fixture identifier. Once the data is submitted, the fixture-workpiece link module 220 extracts the information from the interface and stores it in association with the fixture record in the repository 218, thereby linking the workpiece with the fixture module and any possible modifications to the fixture module.

In one form, with the fixture of the fixture module being incorporated within a sub-assembly, the fixture-workpiece interface is configured to track the sub-assembly entering and exiting the fixture module. For example, each sub-assembly is associated with a unique identification number or character string, which may also be provided as a fixture identifier since the sub-assembly having the locator is considered a fixture. Accordingly, modifications to the sub-assembly may still be tracked as modifications to the fixture.

To access the data stored in the fixture module repository 218, the data search controller 214 is configured to perform different search commands based on the data provided by the external computing device 202. A search interface includes query fields related to one or more search parameters executable by the data search controller 214. The query field include, for example, barcode data provided by scanning the barcode stamp 224, location, processing cell, and/or information indicative of the part/job number associated with the workpiece being processed. Based on the information populated in the query field, the search controller 214 builds a search query, searches the fixture module repository 218, and outputs the results to the computing device 202. For example, if the data search controller 214 receives barcode data, the search controller 214 acquires the fixture record associated with the barcode data from the fixture module repository 218 and displays information from the acquired fixture record, such as location of the fixture module, processing cell having the fixture module, fixture identifier (s), and data related to one or more workpieces linked to the fixture module. In another example, if the data search controller 214 receives a part/job number associated with a subject workpiece, the controller 214 outputs information related to one or more fixtures that the subject workpiece was mounted on and any possible modifications to the fixtures for accommodating the workpiece. The data search controller 214 can be configured to perform various searches to output different results based on the search inquiry, and should not be limited to the examples provided herein.

Figure 3:
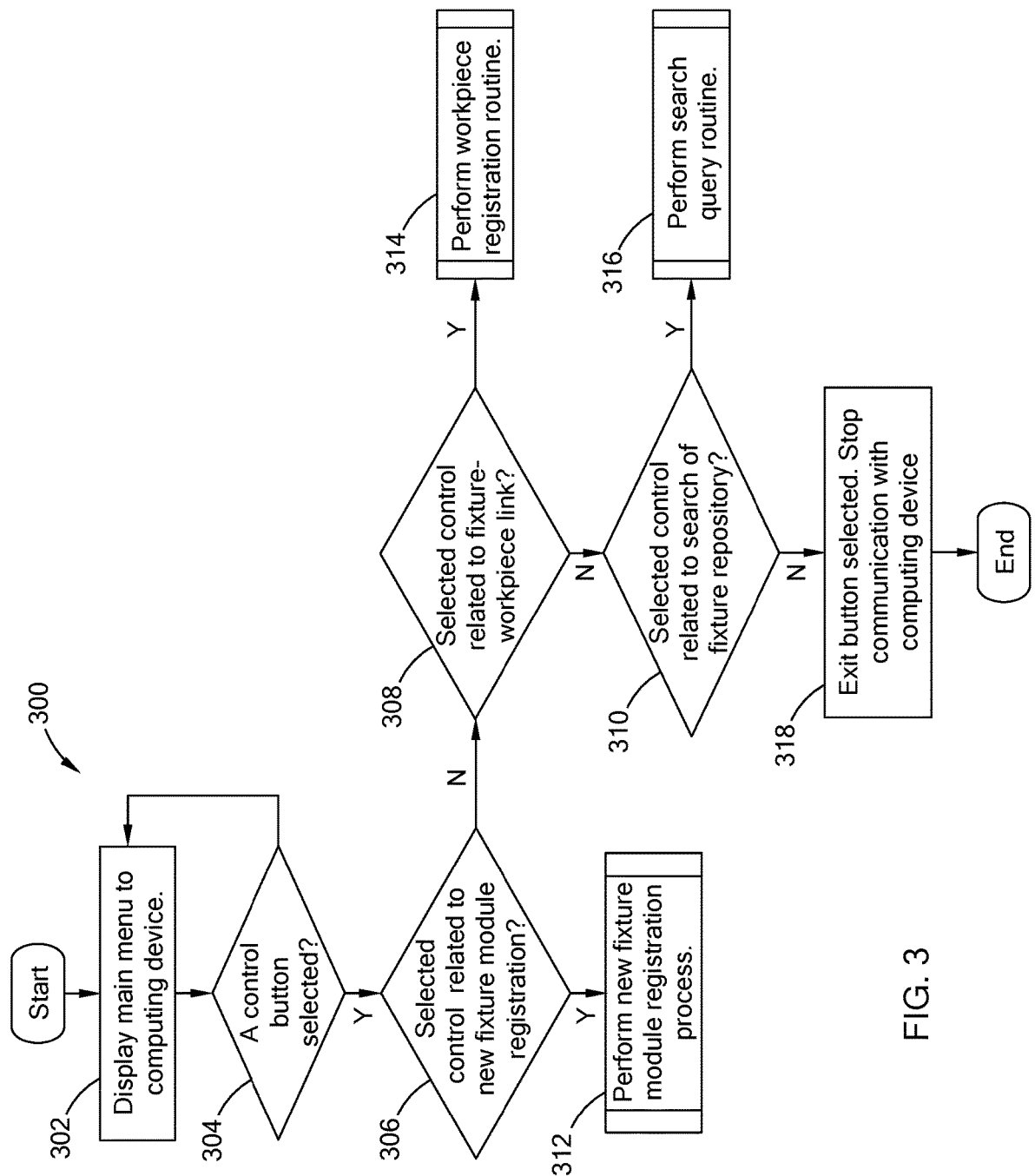
FIG. 3 is a flowchart of a fixture control routine performed by the dimensional automated linkage system in accordance with the teachings of the present disclosure.
Figure 4:
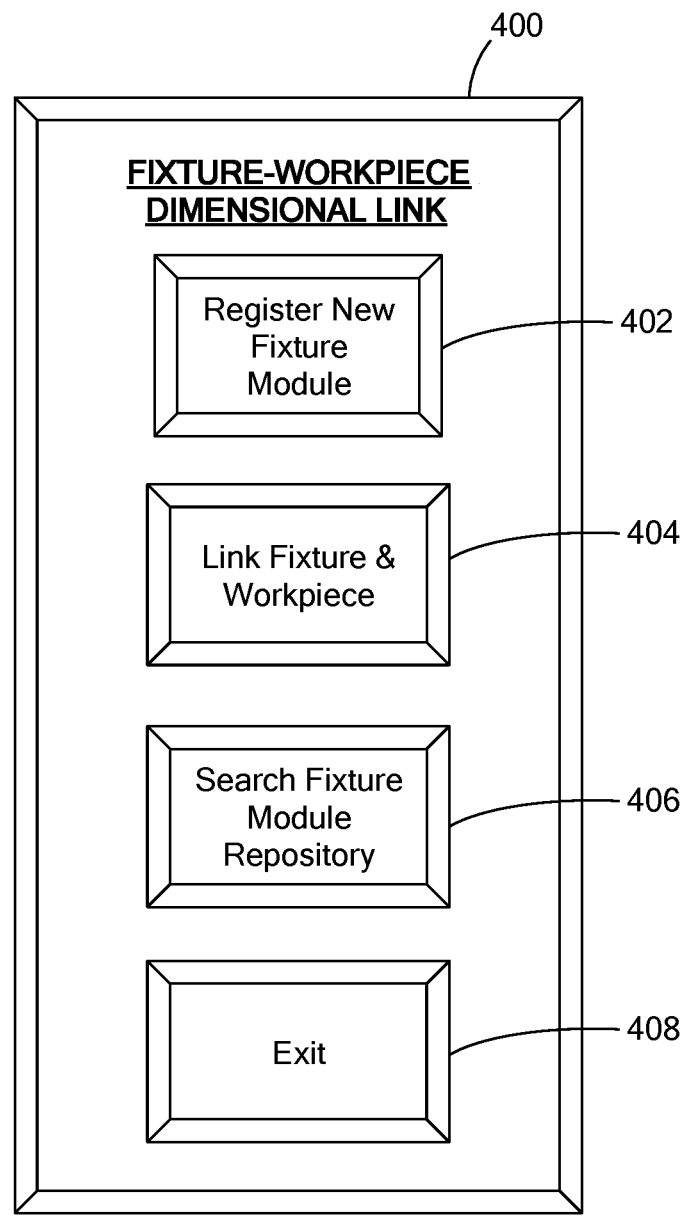
FIG. 4 illustrates a main menu interface displayed by the dimensional automated linkage system in accordance with the teachings of the present disclosure.

Referring to FIG. 3, an example of a fixture control routine 300 performed by the dimensional automated linkage system 200 is provided. In one form, the system 200 initiates the routine in response to receiving a communication request from the computing device 202. At 302, the system 200 displays a graphical user interface (GUI) that is indicative of a main menu for accessing features of the system 200. For example, FIG. 4 illustrates an example GUI for a main menu 400 of the dimensional automated linkage system 210. The main menu 400 includes multiple control buttons 402 to 408 operable by the user via the computing device 202 to execute different commands stored and executable by the system 200. For example, the button 402 titled "Register New Fixture Module" executes a series of instructions to create and store a fixture record for a fixture module. The button 404 titled "Link Fixture & Workpiece" executes a series of instructions to update a selected fixture record with information regarding a workpiece mounted at the selected fixture module. The button 406 titled "Search Fixture Module repository" executes a series of instructions to perform a search of the fixture module repository based on a search query formed by inputs received from the computing device 202. The button 408 titled "Exit" executes a series of instructions to stop communication with the external computing device and logout of the main menu 400.

At 304, the system 200 determines whether one of the buttons 402, 404, 406, and 408 is selected by the computing device 202, and if selected, the system 200 determines if the control is related to a new fixture module registration at 306, to a fixture-workpiece link at 308, or to a search of the fixture module repository at 310. If a new fixture module registration is requested, the system 200 continues to a registration process at 312. If a fixture-workpiece link operation is requested, the system 200 continues to a workpiece registration routine at 314. If a search operation is requested, the system 200 continues to a search query routine at 316. If none of the operation buttons 402, 404, and 406 are selected, the system 200 determines that the exit button was selected and stops communication with the computing device at 318.

Figure 5:
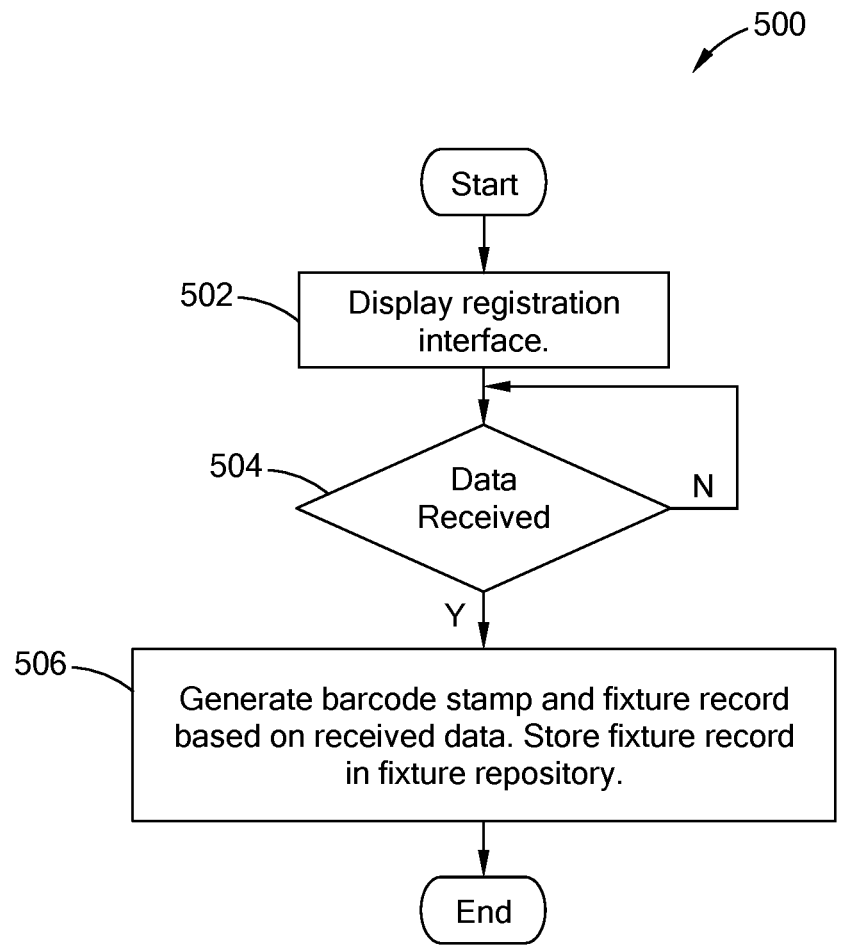
FIG. 5 is a flowchart of a new fixture registration routine performed by the dimensional automated linkage system in accordance with the teachings of the present disclosure.
Figure 6A:
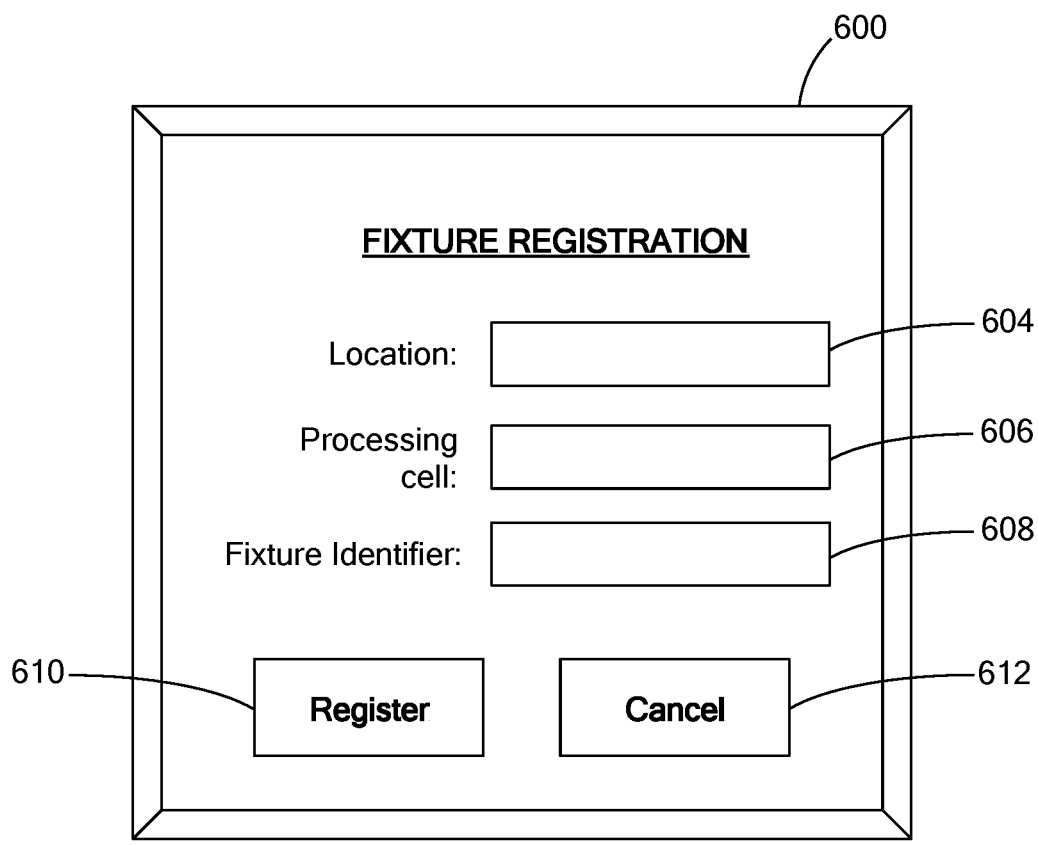
FIG. 6A illustrates a registration interface displayed by the dimensional automated linkage system in accordance with the teachings of the present disclosure.

Referring to FIG. 5, from 312, the system 200 continues to a new fixture module registration routine 500 in which the system displays, at 502, a GUI of a registration interface that includes one or fields to be populated by the user. For example, FIG. 6 illustrates a registration interface 600 that includes query fields 604, 606, and 608 to be populated by the user to provide information indicative of the location of the fixture module, a processing cell having the fixture, and/or a fixture identifier. The interface 600 includes a register button 610 for transmitting the information to the system 200 and a cancel button 612 for canceling the registration routine.

At 504, the system 200 determines whether data from the registration interface is received. If so, the system 200 generates a fixture record and a barcode stamp based on the data received, at 506. The fixture record is stored in the fixture module repository by the system 200, and the barcode stamp is attached on the fixture or at an object associated with the fixture module by an operator. If the user, operates the cancel button 612, the system 200 automatically cancels the routine 500 and either returns to the start of routine 300 or stops communicating with the computing device.

FIG. 6B illustrates an example of a fixture record 620 that includes a fixture module portion 630 that provides detail regarding the registered fixture module and a workpiece entry portion 640 for tracking the workpieces that were mounted on the registered fixture module. The workpiece entry portion 640 includes fields for: recording the date and time the entry was made; the part/job number associated with the workpiece; the shift in which the workpiece was mounted and the engineer in charge of the workpiece; and modifications to the fixture locators to align the workpiece with the fixture. The fixture record can be configured in various suitable ways to associate the fixture with the workpiece and to track modifications to the fixture. For example, in one form, with the sub-assembly as the fixture, the workpiece entry portion is adjusted as a fixture-workpiece portion and includes a column for entering a fixture identifier for a sub-assembly. Accordingly, the modifications to the sub-assembly is tracked with the workpiece.

Figure 7:
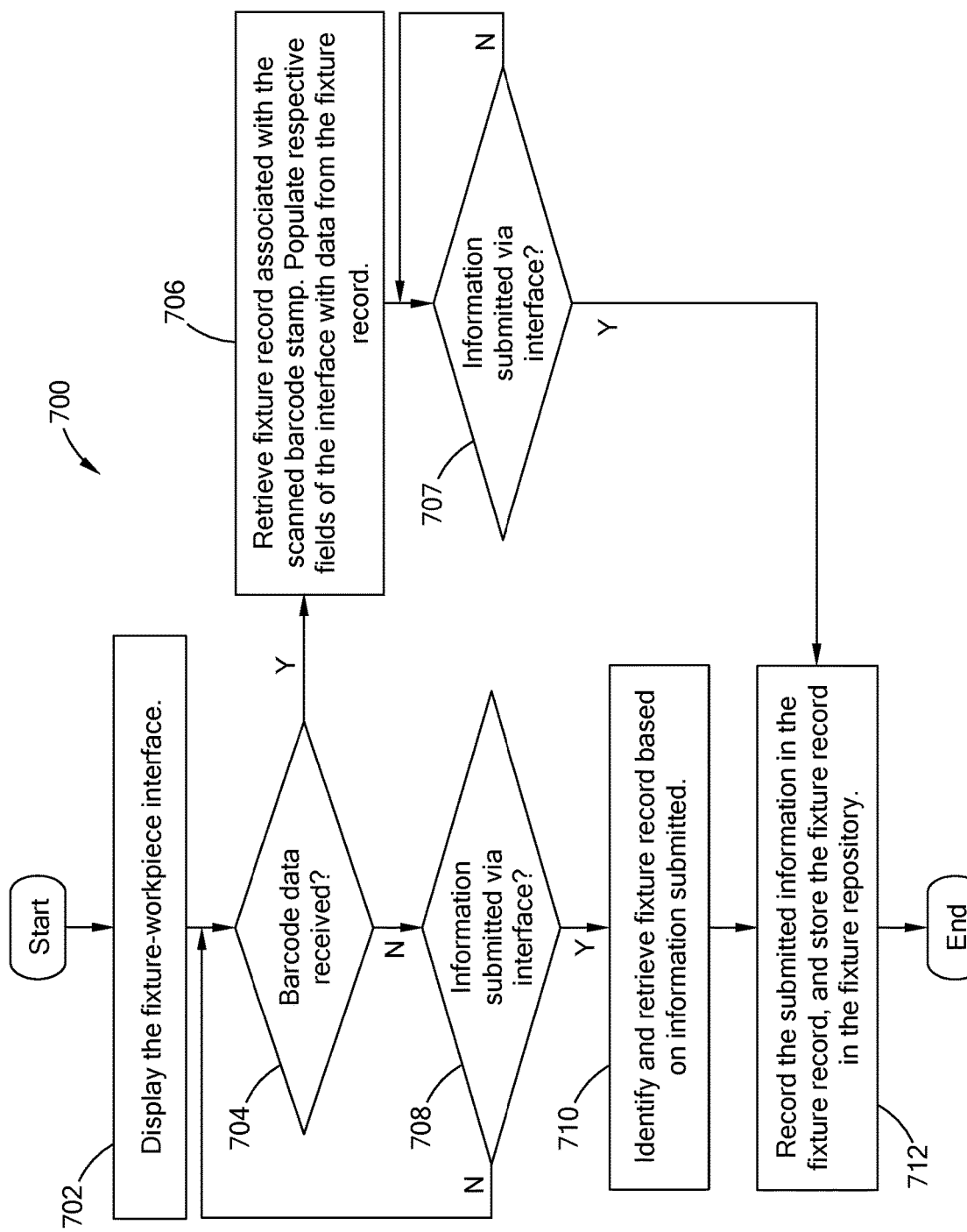
FIG. 7 is a flowchart of a workpiece registration routine performed by the dimensional automated linkage system in accordance with the teachings of the present disclosure.

Referring to FIG. 7, the system 200 performs a workpiece registration routine 700 to associate a selected fixture module with a workpiece. At 702, the system 200 displays the fixture-workpiece interface to have one or more query fields populated by the user. For example, FIG. 8 illustrates an example fixture-workpiece interface 800 for linking the fixture module and the workpiece. The fixture-workpiece interface includes one or more set fields and one or more query fields. In one form, the set field includes a date and time stamp 802, and fields that are automatically populated by the system when the barcode is scanned, which include a location field 804, a processing cell field 806, and/or a fixture identifier field 808. If a barcode stamp is not scanned, the location field 804, the processing cell field 806, and the fixture identifier field 808 are provided as query fields to be populated by the user. Other query fields are provided to capture information for identifying the workpiece (e.g., a part/job number field 810), identifying when the workpiece was mounted (e.g., shift field 812 and an engineer field 814), and information regarding modifications to one or more locators along the fixture (e.g., fields 816, 818, and 820). The user transmits the information to the system 200 by selecting the submit button 822 or may exit the operation by selecting the cancel button 824.

At 704, the system 200 determines whether barcode data is received from the computing device. For example, once a user selects the button 404 for linking the fixture module and workpiece, the user is prompted to or may automatically scan the barcode stamp associated with the fixture module to be linked. Once scanned, the computing device 202 transmits data associated with the barcode stamp to the system 200. At 706, using the barcode data, the system 200 acquires the fixture record associated with the barcode stamp and populates one or more fields of the fixture-workpiece interface with data provided in the fixture record. At 707, the system 200 determines whether the information requested via the interface is received. If so, the system 200 proceeds to 712.

If the barcode data is not received, the system 200 determines whether the information requested via the interface is submitted at 708. From 708, if the information is submitted, the system 200 identifies and retrieves the fixture record for the fixture module matching one or more of the fields of the fixture-workplace interface. For example, the system 200 searches the fixture module repository for a fixture record that has data matching the same location, processing cell, and/or the fixture identifier.

Once the fixture record is retrieved at 710 or the information is submitted at 707, the system 200 records or saves the information provided from the interface in the fixture record and then stores the fixture record in the fixture module repository, at 712. For example, in one form, the system 200 stores data indicative of: the date and time the information was submitted; the part/job number to identify the workpiece mounted on the fixture; the shift and engineer to establish when the workpiece was mounted; and modifications made to one or more locators if the fixture locators were modified. In another example, with the sub-assembly as a fixture, the system 200 stores the identification number associated with the sub-assembly in correlation with the workpiece. Accordingly, the fixture and the workpiece are linked, and information regarding any modifications to the fixture is associated with the workpiece to further indicate that the dimensions or design characteristics of the workpiece may vary from a set standard. Similar to routine 500, if the user, operates the cancel button, the system 200 automatically cancels the routine 700 and either performs the routine 300 or stops communication with the computing device.

Figure 9:
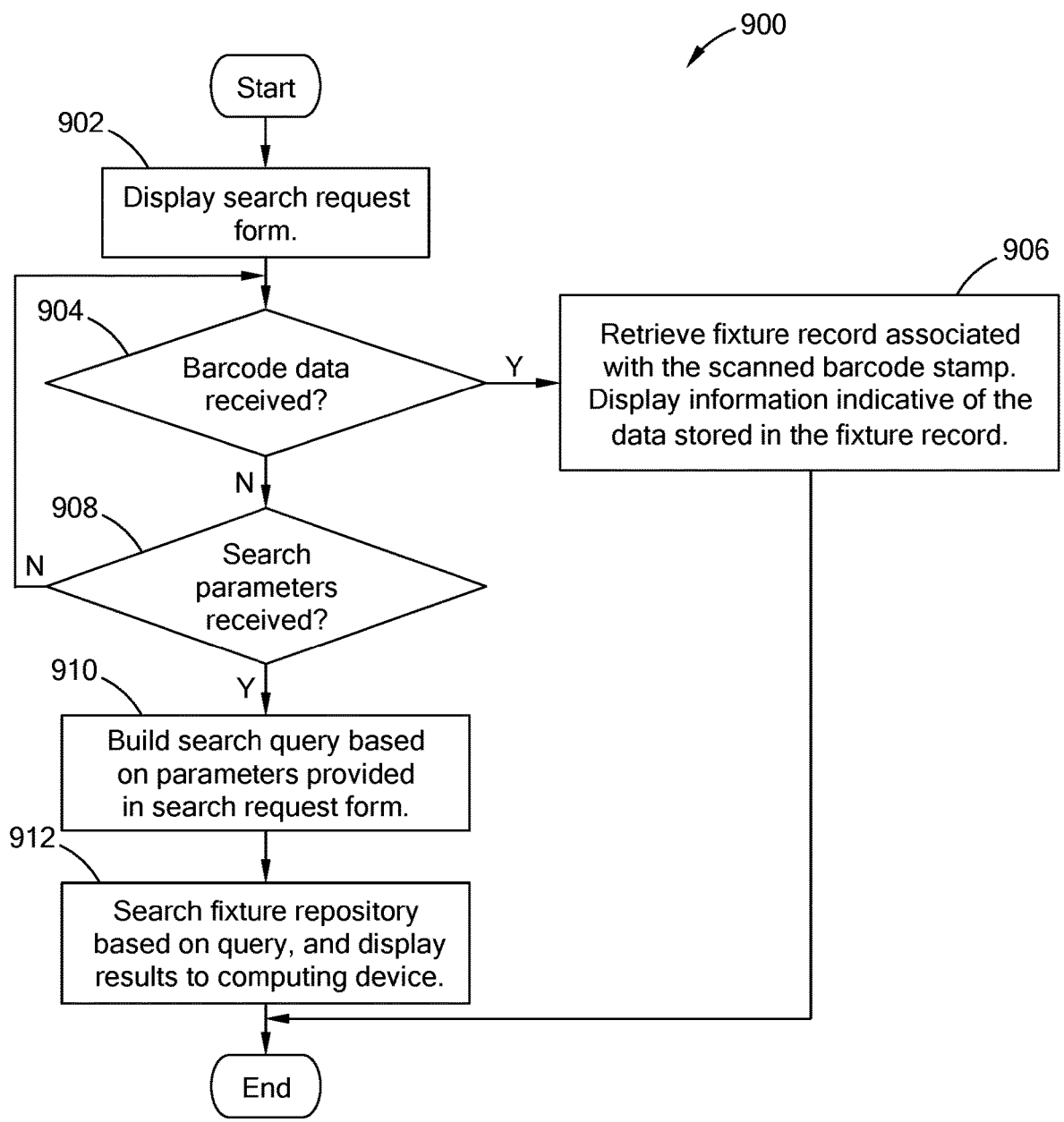
FIG. 9 is a flowchart of a search request routine performed by the dimensional automated linkage system in accordance with the teachings of the present disclosure.
Figure 10:
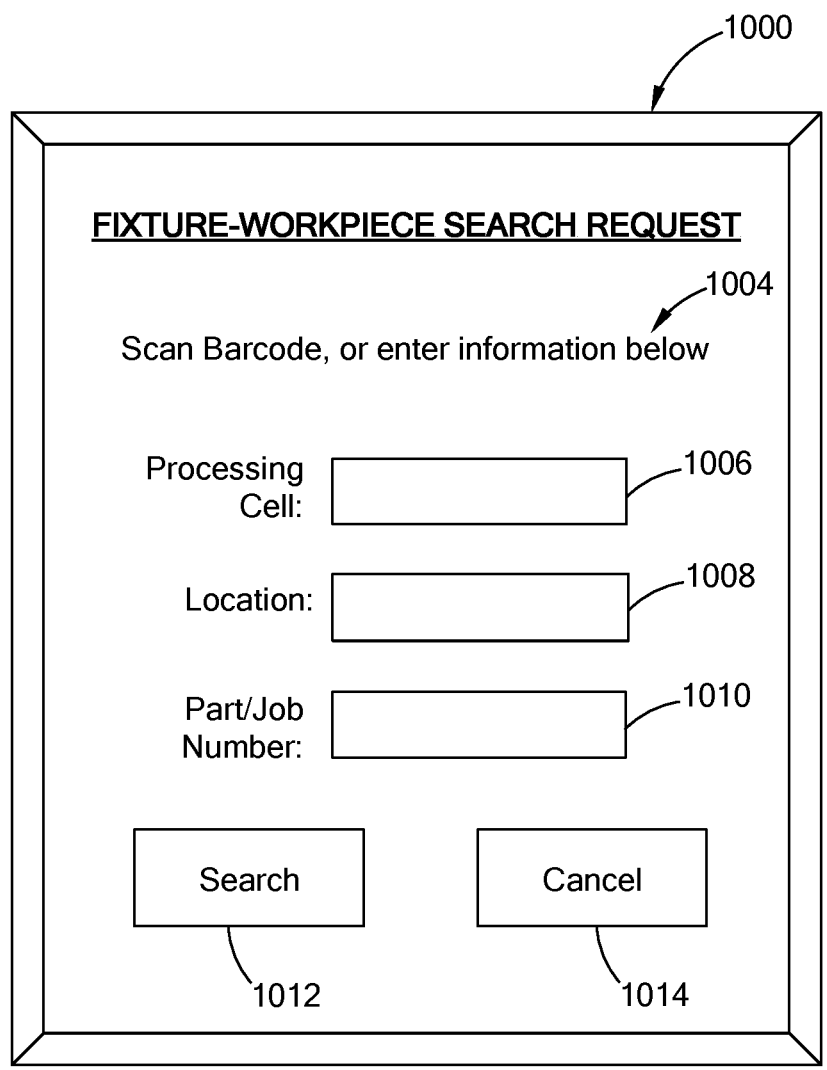
FIG. 10 illustrates a search interface displayed by the dimensional automated linkage system in accordance with the teachings of the present disclosure.

Referring to FIG. 9, a search request routine 900 is performed by the system in response to the selection of the operation button "Search Fixture Module repository" 406. In one form, at 902, the system displays a search interface that includes one or more query fields to be populated by the user. For example, FIG. 10 illustrates an example search interface 1000 that includes a barcode request text 1004 (set field), and multiple query fields which include: a processing cell field 1006; a location field 1008; and a part/job number field 1010. The barcode request text 1004 instructs the user to scan the barcode stamp of the subject fixture or enter information in one or more of the query fields. Accordingly, if the user does not have access to the barcode stamp, the user can still search the fixture module repository by populating one or more of the query fields. The user is able to transmit the search request by selecting the search button 1012 or may exit the operation by selecting the cancel button 1014.

At 904, the system 200 determines whether barcode data is received. That is, if the user scans the barcode stamp on a fixture, the system 200 receive barcode data and then, at 906, retrieves the fixture record associated with the barcode stamp and displays information provided in the fixture record. If the barcode data is not received, the system 200 determines at 908 whether the search parameters are received. In one form, the system 200 may be configured to perform the search as the user is populating the fields of the search interface. In another form, the system 200 performs the search once the user selects the search button 1012. In either situation, the system builds a search query based on the parameters provided in the search interface, at 910. At 912, the system searches the fixture module repository based on the query and displays the results to the computing device. For example, based on the parameters provided from the populated search interface, the system 200 selects one or more fixture records that include at least one of the parameters specified by the user. For example, if the part/job number field is populated, the system 200 retrieves fixture records that are associated with the part/job number identified in the search interface. In another example, if the location field is populated, the system 200 outputs data identifying each fixture record that is associated with the location entered in the query field. In yet another example, if the location field and the processing cell are entered, the system 200 retrieves the fixture record(s) that are associated with the location and processing cell entered. Similar to routine 500, if the user, operates the cancel button, the system automatically cancels the routine 900 and either performs the routine 300 or stops communication with the computing device.

The dimensional automated linkage system of the present disclosure links, in an automated manner, a selected fixture module with a workpiece and tracks design/dimensional variations of the workpiece by recording modifications made to the fixture. This data is then used to further develop the fixture and/or part associated with the workpiece by analyzing, for example, manufacturing tolerances, quality of the workpiece, and/or design modifications to the fixture/workpiece. More particularly, once registered, an operator may scan the barcode stamp at the registered fixture module to retrieve the record for the fixture module. The operator may then enter data regarding modifications made to the fixture and information identifying the workpiece. This information is then stored in the record and accessible by others via the dimensional automated linkage system. For example, a user, such as an engineer, tracks dimensional adjustments made during the manufacturing process of a component by way of one or more fixture records stored in the dimensional automated linkage system.

The dimensional automated linkage system may be configured in various suitable ways for performing the various operations described above and should not be limited to the routines and interfaces describes herein. For example, in one form, the fixture record may be a working document stored in the database of the fixture module repository. Accordingly, the barcode stamp may include data, such as a file path, that opens the working document when the barcode stamp is scanned, and allows the user to edit and save the document. Thus, the working document operates as a fixture-workpiece interface.

Figure 11:
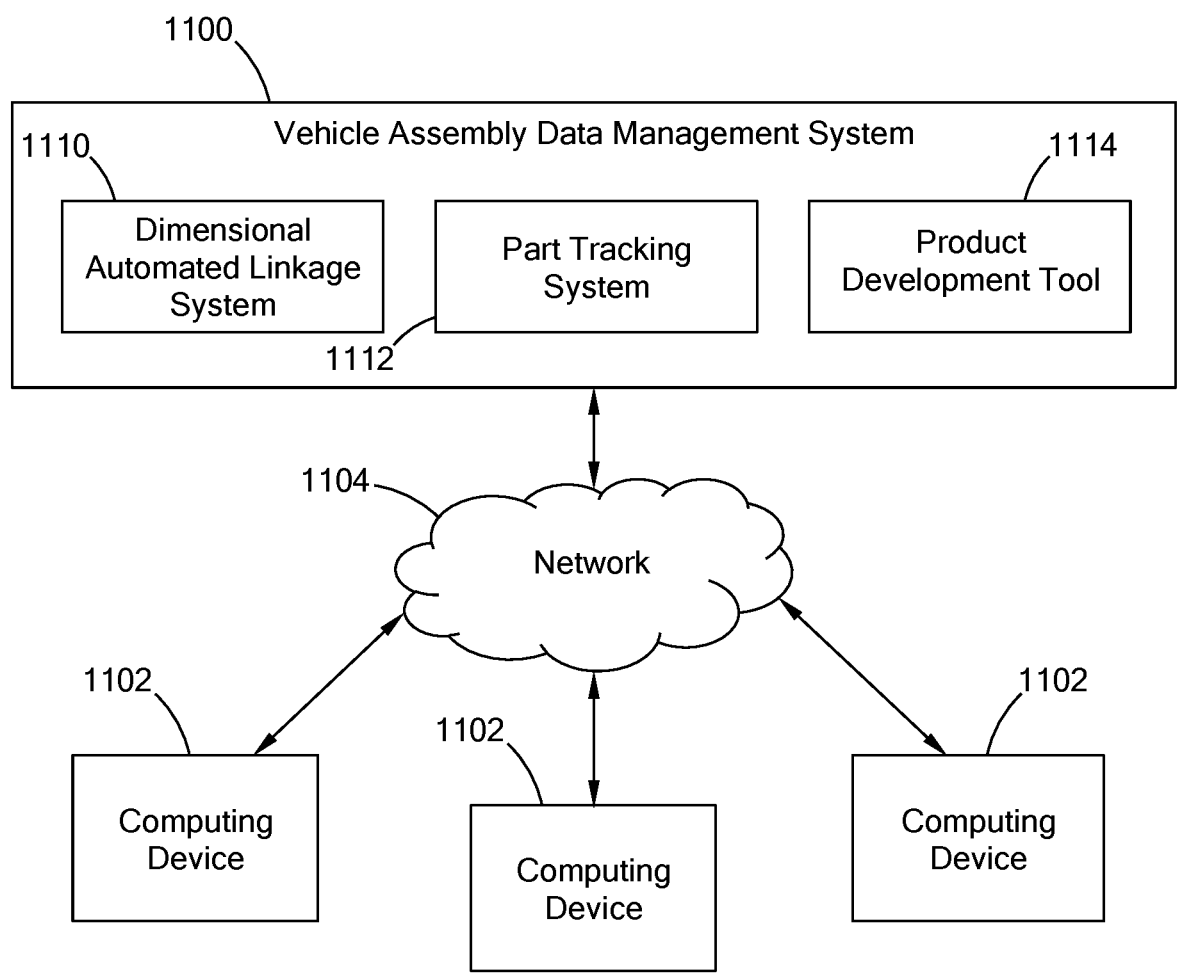
FIG. 11 is a block diagram of a vehicle assembly data management (VADM) system having the dimensional automated linkage system in accordance with the teachings of the present disclosure.

The dimensional automated linkage system of the present disclosure may be part of a larger article assembly data management system that is able to correlate the data from the dimensional automated linkage system with other data associated with the final article assembled. For example, in one form, FIG. 11 illustrates a vehicle assembly data management (VADM) system 1100 that stores and manages data regarding the manufacturing a vehicular components/subsystems and the assembly of the vehicle. In one example, for a given vehicle, the VAD system 1100 is configured to store: vehicle identification information such as the vehicle identification number (VIN), make, model, assembly date; bill of material for the vehicle; performance test data for the vehicle and for sub-systems within the vehicle; quality measurements of various vehicular parts (e.g., dimensional measurements, alignments, etc); and/or manufacturing locations/supplier information for different vehicular components. The VADM system 1100 may also include developmental tools that are operable to perform different analysis on the data stored.

In one form, the system 1100 includes one or more servers accessible by one or more external computing devices 1102 via a communication network 1104. The computing devices 1102 are computers that are operable to access various information provided in the system 1100. In one form, the VADM system 1100 includes a dimensional automated linkage system 1110, a part tracking system 1112, and a product development tool 1114. The dimensional automated linkage system 1110 is similar to the system 200 of the present disclosure.

The part tracking system 1112 may be a server configured to store information regarding one or more vehicular components as the component is being manufactured, such as identification information (e.g., part/job number), manufacturing locations, and/or manufacturing cell(s) visited by the component. For example, a vehicular component, such as a headlamp, compressor, door panel assembly, is typically assigned an identification number, and undergoes different tests/measurement as it is being manufactured to verify the component is meeting engineering specifications. This and other data, such a manufacturing location, are stored in relation to the vehicular component.

The product development tool 1114 provides different data analysis programs operable by a user, such as a program engineer, product development engineer, manufacturing operator. In one form, the product development tool 1114 is provided as computer executable instructions executed by a processor in one of the servers of the VADM system 1100. For example, the data analysis programs may include a series of instructions that generate a component process timeline that outputs a graph illustrating the location of the component during its manufacturing timeline by analyzing data provided in the part tracking system 1112 and the dimensional automated linkage system 1110. Specifically, a given component/part is identified by the same job/part number by both systems 1110 and 1112, and thus, the product development tool 1114 can create a timeline depicting the processing of the component and identifying predefined events such as modification to a fixture on which the workpiece is mounted. Thus, notifying to a user a dimensional/design variation of the workpiece and when such variation was recognized.

By implementing the dimensional automated linkage system with the VADM system, a user, such as a product development engineer, a manufacturing operator, or a research development professional, is able to correlate fixture modifications with a mounted workpiece to assist in further development and quality control of the component/part.

The dimensional automated linkage system of the present disclosure can be implemented as part of other article assembly processes, and is not limited to vehicles. For example, the dimensional automated linkage system can be configured to track dimensional variations during the assembly of electronic devices, furniture, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A dimensional automated linkage system for correlating a fixture with a workpiece, the system comprising:
   a fixture configured to align a workpiece at a desired coordinate or position and restrict movement of the workpiece;
   a fixture module repository configured to store a fixture record for a registered fixture module, wherein the fixture record includes a fixture portion to identify the fixture of the fixture module and a workpiece entry portion to link the registered fixture module with a subject workpiece, the workpiece entry portion includes a fixture modification field to identify modifications made to the fixture during mounting the subject workpiece on the fixture;
   a barcode stamp located at the registered fixture module, wherein the barcode stamp is scanable by a device and is configured to include data to identify the fixture record for the registered fixture module; and
   a fixture-workpiece data controller communicably coupled to an external computing device and operable to populate the workpiece entry portion of the fixture record based on information acquired from the external computing device such that changes to a manufacturing process of the workpiece are monitored as a function of the modifications made to the fixture during mounting the subject workpiece on the fixture.

2. The dimensional automated linkage system of claim 1 further comprising:
   a plurality of barcode stamps located at a plurality of registered fixture module, wherein:
   the fixture module repository stores a plurality of fixture records for the plurality of registered fixture module, wherein one barcode stamp is associated with one fixture record.

3. The dimensional automated linkage system of claim 2, wherein the fixture-workpiece data controller is configured to retrieve a selected fixture record from among the plurality of fixture records in response to the barcode stamp associated with selected fixture record being scanned by the device.

4. The dimensional automated linkage system of claim 1, wherein the data of the barcode stamp is indicative of a file path of the fixture record within the fixture module repository.

5. The dimensional automated linkage system of claim 1 further comprising a data search controller communicably coupled to the external controller and operable to search the fixture module repository based on one or more queries received from the external controller.

6. The dimensional automated linkage system of claim 1, wherein the barcode stamp is positioned on the fixture of the fixture module.

7. The dimensional automated linkage system of claim 1, wherein the barcode stamp is positioned on a cell frame housing the fixture.

8. The dimensional automated linkage system of claim 1, wherein the information from the external computing device includes workpiece identification information to identify the workpiece and fixture modification information that identifies a modification to one or more locators of the fixture, and the fixture-workpiece data controller stores the workpiece identification information and the fixture modification information in the fixture record.

9. A vehicle assembly data management system in communication with one or more external computing devices, the vehicle assembly data management system comprising:
the dimensional automated linkage system of claim 1; and
a part tracking system configured to store manufacturing information related to a plurality of workpieces, wherein the manufacturing information includes at least one of identification information for a workpiece, one or more manufacturing facilities associated with the workpiece, and performance test data of the part formed from the workpiece; and
a product development tool operable to analyze data provided in the fixture-workplace linkage system and the part tracking system based on a command from an external computing device.

10. A method for linking dimensional features of a fixture with a workpiece, the method comprising:
storing, by a repository, a plurality of fixture records for a plurality of registered fixture module, wherein each fixture record includes a fixture portion to identify a fixture associated with the fixture module and a workpiece entry portion to link the registered fixture module with a subject workpiece, the workpiece entry portion includes a fixture modification field to identify modifications made to the fixture for mounting the subject workpiece on the fixture and the fixture is configured to align a workpiece at a desired coordinate or position and restrict movement of the workpiece;
associating a plurality of barcode stamps with the plurality of fixture records, wherein each barcode stamp is configured to include data to identify a fixture record from among the plurality of fixture records;
displaying, by a controller, a linkage interface in response to a barcode stamp among the plurality of barcode stamps being scanned, the linkage interface having multiple query fields to be populated by a user via an external computing device, wherein the multiple query fields includes a workpiece identification field to obtain information regarding the workpiece and a fixture modification field to obtain information regarding a modification to the fixture due to the workpiece;
extracting, by the controller, data from one or more of the populated query fields from among the multiple query fields of the interface; and
storing, by the controller, the extracted data in the workpiece entry portion of the fixture record associated with the scanned barcode stamp; and
monitoring changes to a manufacturing process of the workpiece as a function of modifications made to the fixture during mounting of the workpiece on the fixture.

11. The method of claim 10 further comprising registering a fixture module with the fixture module repository as one of the plurality of registered fixture modules.

12. The method of claim 11, wherein the registering the fixture module further comprises:
generating, by the controller, a fixture record for the fixture module, and storing the fixture record in the fixture module repository as one of the plurality of fixture records;
associating a barcode stamp with the fixture record for the fixture module; and
attaching the barcode stamp to at least one of the fixture or an object associated with the fixture module.

13. The method of claim 10, wherein the data of the barcode stamp is indicative of a file path of the fixture record within the fixture module repository.

14. The method of claim 10 further comprising monitoring changes to the manufacturing process of the workpiece due to dimensional variations between a plurality of workpieces and as a function of modifications made to the fixture during mounting of the plurality of workpieces on the fixture.

15. The method of claim 10 further comprising:
displaying, by a data search controller, a search interface having one or more search query fields to be populated, wherein the one or more search queries is associated with data for at least one of identifying a fixture record among the plurality of fixture records or identifying a workpiece linked to one or more of the registered fixture modules by way of the fixture record;
searching, by the data search controller, the fixture module repository based on one or more populated search queries received the external controller; and
outputting the results of the search to the external computing device.

16. A vehicular dimensional automated linkage system comprising:
a fixture configured to align a workpiece at a desired coordinate or position and restrict movement of the workpiece;
a repository storing a fixture record for a fixture module, the fixture record having a workpiece entry portion to track modifications to a fixture of the fixture module;
a barcode scanable by a device to retrieve the fixture record of the fixture module; and
a data controller operable to populate the workpiece entry portion of the fixture record based on workpiece information acquired from an external computing device such that changes to a manufacturing process of the workpiece upstream of the fixture are monitored as a function of the modifications made to the fixture during mounting the subject workpiece on the fixture.

17. The vehicular dimensional automated linkage system of claim 16, wherein the barcode is positioned on the fixture of the fixture module.

18. The vehicular dimensional automated linkage system of claim 16, wherein the barcode is positioned at a cell frame of the fixture module housing the fixture.

19. The vehicular dimensional automated linkage system of claim 16 further comprising:
a plurality of the barcodes for a plurality of fixture modules, wherein:
the repository stores a plurality of fixture records for the plurality of fixture modules, wherein one barcode is associated with one fixture record.

20. The vehicular dimensional automated linkage system of claim 19, wherein the data controller is configured to retrieve a selected fixture record from among the plurality of fixture records in response to the barcode associated with selected fixture record being scanned.

* * * * *